United States Patent [19]

Gladwin

[11] 3,906,834
[45] Sept. 23, 1975

[54] METHOD OF FORMING LARGE RADIUS CURVES ON PLATE SURFACES

[76] Inventor: Floyd R. Gladwin, P.O. Box 1113, Southgate, Mich. 48192

[22] Filed: Apr. 4, 1974

[21] Appl. No.: 458,000

[52] U.S. Cl. .................................. 90/11 C; 90/15 R
[51] Int. Cl.² ........................ B23C 3/00; B23C 3/16
[58] Field of Search ............ 90/11 C, 15 R, DIG. 2, 90/11 R, 34, 37, 43; 51/324

[56] References Cited
UNITED STATES PATENTS

| | | | |
|---|---|---|---|
| 2,855,664 | 10/1958 | Griffith et al. | 90/11 C X |
| 3,093,370 | 6/1963 | May et al. | 90/11 R |

FOREIGN PATENTS OR APPLICATIONS

| | | | |
|---|---|---|---|
| 643,085 | 6/1962 | Canada | 90/11 C |

*Primary Examiner*—Leonidas Vlachos
*Attorney, Agent, or Firm*—Cullen, Settle, Sloman & Cantor

[57] ABSTRACT

A method of forming a large radius curve surface upon a face of a plate by bending and holding the plate against a curved form, and then machining the exposed, opposite plate face flat and then releasing the plate from the form so that it resiliently springs back into its unbent condition, wherein the machined face assumes a curved shape corresponding to the curvature of the form.

1 Claim, 11 Drawing Figures

METHOD OF FORMING LARGE RADIUS CURVES ON PLATE SURFACES

BACKGROUND OF INVENTION

In my prior U.S. Pat. No. 3,464,314, issued Sept. 2, 1969, and in my co-pending applications, Ser. No. 320,106, filed Jan. 2, 1973, now U.S. Pat. No. 3,800,660 and Ser. No. 442,804, filed Feb. 15, 1974, there are disclosed methods and apparatus for forming curved faces, of large radii, upon a surface of a large metal plate. By way of example, such type plates may be used as die or guide plates in the continuous casting of steel ingots. In such uses, a surface of the plate may be formed as the segment of a circle of, for example, 20 to 40 or 60 or so feet in radius. Such curvature may be in one direction only along the plate or may be transverse to that direction in addition, so as to form a multiple curve face upon the plate. As an example of such a type of plate, a steel or copper or copper alloy plate may be on the order of 2 feet by 4 feet in surface dimension and on the order of about 4 to 6 inches in thickness. Of course, the dimensions may vary considerably. However, the plates which form the general subject matter of this present patent application are contemplated to be relatively large in size with face curvatures of considerable radii.

It is desirable to form the curved surface to close dimensional tolerance, as for example, approximately three thousandths of an inch or less deviation from specified dimension, so that ordinary machining techniques are not practical, either for technical reasons or economic reasons, to form such surfaces. Hence, my above identified patent and applications relate to equipment and methods for producing dimensionally accurate curved surfaces upon large plates. This present application relates to a different method for accurately producing such curved surfaces economically for certain types of materials and uses. Further, it provides a method which is useful with conventionally available manufacturing machinery.

SUMMARY OF INVENTION

The invention herein comtemplates a method of forming a large radius curve or multiple curve upon a surface of a large, generally flat plate utilizing conventionally available manufacturing machinery, such as, for example, a horizontal or vertical spindle milling machine or a planer or shaper or the like, of suitable size. In essence, the method contemplates first making a form or adaptor or holder which has an exposed surface of a size and shape to correspond to the desired finished size and curvature of the plate workpiece. The flat, plate workpiece is then applied upon the form and is bent, within the elastic limits of the plate material, into surface to surface contact with the form, where the plate is held. Thereafter, the exposed face of the plate is machined flat in a suitable manufacturing machine usable for that purpose. Next, the plate is released from the form so that it resiliently springs back into its resiliently unbent condition which results in the exposed, machined face assuming the desired curved finished shape, with the plate face which had been in contact with the form returning to its flat condition.

As can be seen, because the machining is upon a flat or planar surface, highly accurate dimensions can be maintained and superior surface finishes can be accomplished.

The form curved surface may be made utilizing the apparatus and method disclosed in my prior patent and applications. Once a form is made, it may be repeatedly used for manufacturing a number of finished workpieces. Alternatively, the forms may be fabricated by laying a number of thin, rigid metal strips, side by side, near each other, upon a rigid flat supporting surface. By utilizing strips of different thicknesses so that the height varies above the supporting surface, a form surface is fabricated or provided by the numerous parallel line-like strips. By appropriately arranging the pattern of the strips, an imaginary curved surface which is either concave or convex may be formed thereby. By arranging additional strips transversely in a grid-like pattern, further curvatures can be accomplished. Then, the flat workpiece may be forced against the line-like edges of the strips to bend the workpiece and hold it during the machining operation.

Large size plates, as for example used as guides in casting steel, may be made of a copper or copper alloy material or of steel, which has sufficient resiliency to bend to an arc of a large radius curve. For example, with a diameter of somewhere on the order of up to 60 feet, the greatest depth of bend may be somewhere on the order of an eighth of an inch or so, which is well within the elastic limits of the plate materials. Depending upon the type of material used for the plate, greater bending may be performed. With such type materials, the flattened surface tends to assume the curved shape of the supporting form when the material elastically returns to its unbent condition after the machining of its exposed surface.

The foregoing method thus provides a relatively inexpensive way of manufacturing such curved surfaces without necessarily requiring special equipment or inordinately expensive machining equipment which is not otherwise routinely found in machine shops.

The foregoing and other objects and advantages of the invention herein will become apparent upon reading the following description, of which the attached drawings form a part.

DETAILED DESCRIPTION

The purpose of the method herein is to form either a single or compound curve of large radius upon a face of a plate-like workpiece 10. The curvature may be either concave or convex, as desired. By way of example, the plate may be roughly 2 feet by 4 feet by 4 inches in dimension and formed of a metal material such as a suitable steel or copper or copper alloy or the like, which has some limited resiliency so that it may be bent to a limited amount within its elastic limit for return to its original unbent condition.

Figure 1:
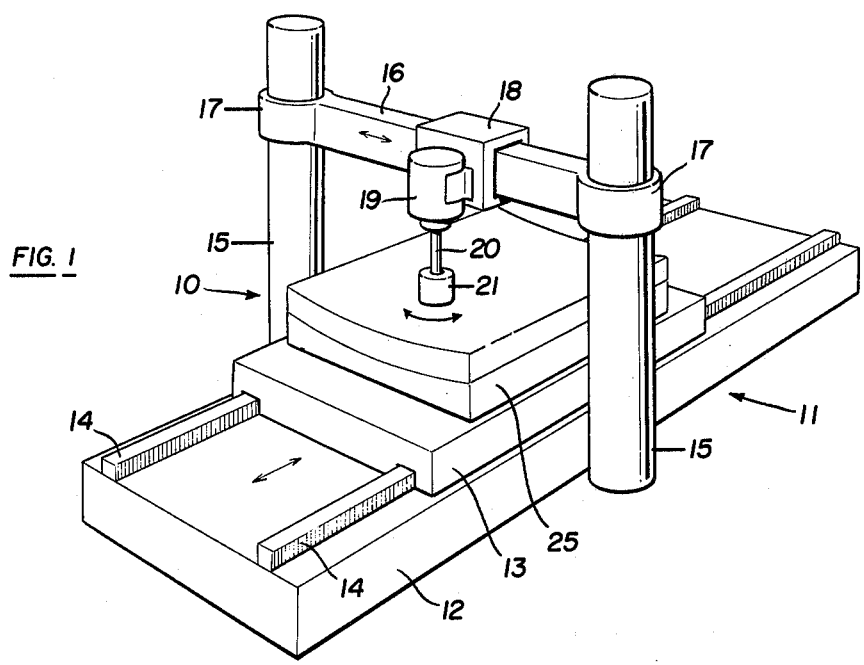
FIG. 1 is a schematic perspective view of a plate workpiece being machined upon a typical vertical spindle type milling machine provided with a reciprocating work supporting table.

Although a variety of conventional material removing machines may be utilized, FIG. 1 schematically illustrates a vertical spindle type milling machine 11, for example purposes. Such a machine includes a horizontal bed 12 with suitable supports for securement upon a floor. A reciprocating table 13 is guided by rails 14 for movement back and forth upon the bed. Being conventional, the operating mechanism for reciprocating the table is omitted.

Vertical support columns 15 on opposite sides of the bed support a cross-bar 16 interconnected with the vertical columns by suitable end connectors 17 so that the cross-bar may be raised or lowered as desired. Such machines include suitable operating equipment for adjusting the height of the cross-bar, which equipment is omitted from the schematic drawing.

A slider 18 is mounted upon the cross bar for horizontal movement back and forth along the length of the cross bar. Mounted upon the slider is an electrical drive motor 19 having a downwardly directed drive shaft 20 upon which is mounted a conventional vertical milling cutter 21. The foregoing schematically illustrated apparatus will form a flat or planar surface upon a workpiece fastened upon the reciprocating table 13 by means of the table repeatedly passing beneath the rotating milling cutter which itself is transversely moved.

As will be recognized, other suitable, equivalent machining equipment may be used such as a horizontally spindled milling machine, grinding machine, etc.

Mounted upon the reciprocating table 13 is an adapter or form 25 which is like a mold having a curved upper surface 26 which forms a rigid support for the workpiece 10. The adapter or form is suitably clamped or bolted to the table so that it may reciprocate with the table beneath the cutter. The curved upper surface 26 is made to conform to the desired dimensions and curvature of the finished face of the plate.

Figure 2:
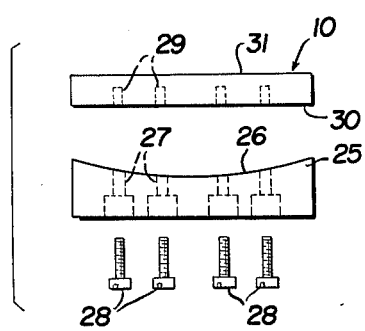
FIGS. 2–6, inclusive, show the successive steps in forming the curved face upon the workpiece.

Referring to FIG. 2 which is a schematic end view of the adapter with the plate workpiece arranged above it, the adapter may be provided with numerous screw holes 27 to receive machine screws 28 which threadedly engage within threaded screw sockets 29 formed in the bottom surface 30 of the plate workpiece 10.

Figure 3:
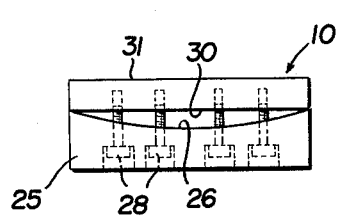
Figure 4:
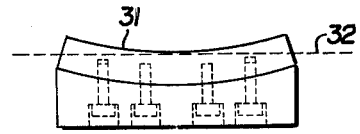

The workpiece is engaged with the screws, as illustrated in FIG. 3. Thereafter the screws are tightened to apply a transverse force which draws the plate against the curved surface 26 of the form, as illustrated in FIG. 4. In this condition, the opposite faces of the workpiece are curved due to the bending of the workpiece, which bending is in the elastic limits of the workpiece material.

Figure 5:
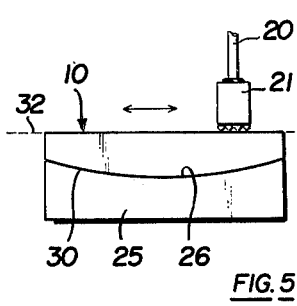

Thereafter, the upper exposed workpiece surface 31 is flattened or made planar, as illustrated by the dotted line 32 in FIGS. 4 and 5, by means of physically removing the required amount of exposed surface material. FIG. 5 schematically illustrates the cutter removing surface material down to the plane of the line 32. By suitable milling or grinding or the like, an accurate and highly finished surface may be formed upon the workpiece.

Figure 6:
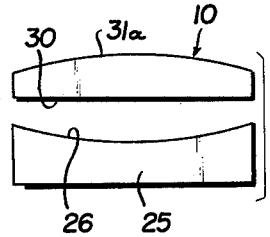

Next, the workpiece is released from the form, that is, by removing the screws 28. As shown in FIG. 6, upon its release, the workpiece, due to its elastic memory, will resiliently spring back into its unbent condition which results in the formerly flat machined exposed surface now assuming a curved surface 31a which corresponds to the curvature and shape of the form surface 26. Likewise, the bottom surface 30 of the workpiece returns to its orginal flat shape. The net result is a highly accurate, well finished surface of the desired shape and finished quality.

Although screws are illustrated as a means for bending and holding the plate in tight surface to surface contact with the form surface, other suitable clamping means may be utilized.

Figure 7:
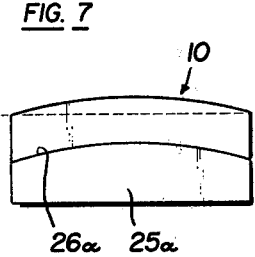
FIGS. 7 and 8, schematically show steps in forming a workpiece with the surface curved oppositely to that obtained in FIGS. 2 through 6.
Figure 8:
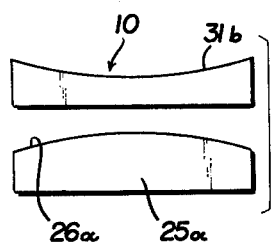

Further, the finished workpiece surface may be formed either convex as in FIG. 6 or may be concavely formed as illustrated in FIGS. 7 and 8, where the adapter or form 25a is provided with a concave support surface 26a against which the workpiece is held and bent. Thus, upon finishing of the exposed surface in the manner set forth above, release of the workpiece will cause it to spring into the shape illustrated in FIG. 8 wherein the exposed surface 31b is concave.

Figure 9:
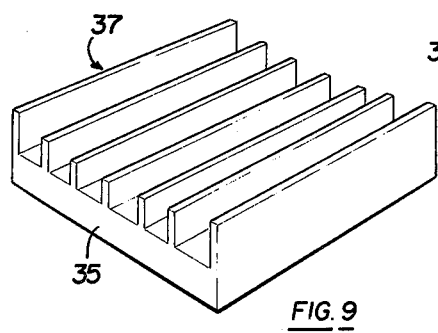
FIG. 9 shows a perspective view of the adapter or form made of numerous support strips.
Figure 10:
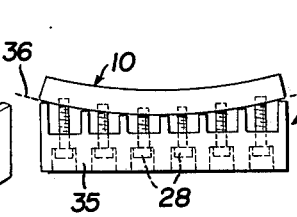
FIG. 10 is an end view of the form of FIG. 9, showing a workpiece secured thereto.

The adapter or form itself, rather than being made with a complete support surface as described above, may be formed of a multiple support strip surface as illustrated in FIG. 9. Thus, the form of FIG. 9 may be formed of a rigid flat plate 35 having a curved upper surface 36 which is discontinuous and formed of numerous parallel line-like supporting edges made of numerous parallel strips 37 fastened upon the upper surface of the plate 35. These strips 37 may be laid side by side parallel to each other, spaced apart a short distance and suitably bolted or screwed to the support plate 35. By varying the thickness of each of the strips, in the vertical direction, that is, the height at which the individual strips extend above the upper surface of the plate 35, an imaginery curved surface is provided. As illustrated in FIG. 10, when the workpiece 10 is secured to the form 35, utilizing the screws 28 previously mentioned, the plate is supported upon numerous parallel lines which cause the plate to bend due to the variation in height of the strips.

Figure 11:
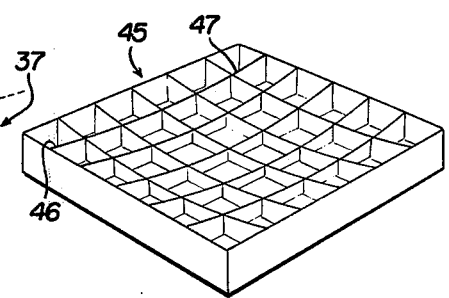
FIG. 11 is a perspective view, similar to FIG. 9, but showing a modified form having a grid-like surface.

FIG. 11 illustrates a modified adapter or form 45 whose support surface is formed by a grid 46 provided by strips as mentioned above, but with the strips arranged transversely. The strips 47, have curved upper surfaces rather than straight as in the case of FIG. 9, so as to provide the grid-like support beneath the workpiece and also make it possible to multiplally curve or bend the workpiece.

As can be seen, where the form support surface, such as the strips of FIG. 9, are straight, the workpiece may only be curved in one direction, and thus, to then perform a multiple or compound curve upon the workpiece, it may be necessary to remove it from one form and apply it to another form having a transversely arranged curve surface. Thus, the grid-like support of FIG. 11 permits a one-step multiple curving during bending of the workpiece.

Having fully described an operative embodiment of this invention, I now claim:

1. A method of forming a continuous curved surface on a face of a large, substantially flat, plate-like workpiece formed of a relatively resilient material, by removing material from one surface of the workpiece, comprising the sequential steps of:

1. forming a curved shape, substantially continuous workpiece support surface on a form, said support surface being closely shaped to the desired curved surface contour and curvature dimensions and having a configuration conjugate to the curved surface on the finished workpiece, and said form having a plurality of through, nonthreaded bolt holes extending to the substantially continuous curved surface contour;

2. positioning a workpiece on the support surface and aligning blind, threaded bolt holes in the workpiece with the non-threaded bolt holes in the curved surface of the form; said blind threaded bolt holes being formed in a surface of the workpiece which engages the support surface;

3. inserting bolts through the non-threaded holes of the form and threading the bolts into the blind threaded bolt holes in the workpiece, thereby (a) transversely drawing the workpiece against the curved support surface and (b) bending the workpiece within its elastic limits, to the contour of the curved support surface;

4. holding the bent workpiece against and in face to face contact with the substantially continuous, curved support surface whereby the workpiece is firmly and immovably supported in such contact and remains bent, the opposite face of the workpiece being exposed and having a shape substantially the same as the substantially continuous support surface;

5. physically removing material from the exposed face of the workpiece to form such exposed face into a substantially flat continuous, planar shape; and 6. then unthreading the bolts from the threaded bolt holes in the workpiece to release the workpiece from the substantially continuous curved supported surface and permitting it to resiliently bend back into its original unbent condition, to thereby cause the exposed face to spring into a curved form corresponding to the desired curved surface which is substantially conjugate to the curved shape surface of the form.

* * * * *